(12) United States Patent
Martell

(10) Patent No.: US 10,589,945 B2
(45) Date of Patent: Mar. 17, 2020

(54) PROTECTIVE PANEL FOR SHIELDING A DOCK PAD

(71) Applicant: Ernest Martell, Lake Havasu, AZ (US)

(72) Inventor: Ernest Martell, Lake Havasu, AZ (US)

( * ) Notice: Subject to any disclaimer, the term of this patent is extended or adjusted under 35 U.S.C. 154(b) by 0 days.

(21) Appl. No.: 16/100,160

(22) Filed: Aug. 9, 2018

(65) Prior Publication Data
US 2019/0047803 A1 Feb. 14, 2019

Related U.S. Application Data

(60) Provisional application No. 62/542,954, filed on Aug. 9, 2017.

(51) Int. Cl.
*B65G 69/28* (2006.01)
*B65G 69/00* (2006.01)

(52) U.S. Cl.
CPC ......... *B65G 69/2876* (2013.01); *B65G 69/00* (2013.01); *B65G 69/008* (2013.01)

(58) Field of Classification Search
CPC ... B65G 69/2876; B65G 69/00; B65G 69/008
USPC .................................................. 52/211–213
See application file for complete search history.

(56) References Cited

U.S. PATENT DOCUMENTS

| | | | | |
|---|---|---|---|---|
| 3,318,061 A | * | 5/1967 | Stentz | E04F 19/028 248/345.1 |
| 4,587,762 A | * | 5/1986 | Adell | B60R 13/043 49/462 |
| 4,638,618 A | * | 1/1987 | Iesaka | B44C 1/28 52/36.4 |
| 5,182,880 A | * | 2/1993 | Berge, Jr. | E06B 1/34 49/460 |
| 6,526,708 B1 | * | 3/2003 | Hartley | E06B 1/34 248/345.1 |
| 7,204,059 B2 | * | 4/2007 | Schiffmann | E04G 21/30 49/460 |
| 8,091,299 B2 | * | 1/2012 | Katz | A47B 35/00 52/211 |
| 9,175,507 B2 | * | 11/2015 | Davis | E06B 7/16 |
| 9,441,411 B2 | * | 9/2016 | Davis | E04F 19/028 |
| 9,759,006 B2 | * | 9/2017 | Davis | E04F 19/028 |
| 9,926,708 B1 | * | 3/2018 | Janko | A47G 1/17 |
| 10,060,464 B2 | * | 8/2018 | Brewer | F16B 37/12 |
| 2004/0221527 A1 | * | 11/2004 | Sykora | E06B 1/34 52/213 |
| 2005/0045784 A1 | * | 3/2005 | Pitlor | H02G 3/20 248/206.5 |

(Continued)

*Primary Examiner* — Brent W Herring

(57) ABSTRACT

A protective panel for shielding a dock pad while loading and unloading cargo includes a protective panel, a plurality of mounting holes, and a plurality of panel fasteners. The protective panel is mounted to a metallic door jamb of a loading dock via the plurality of panel fasteners. The plurality of mounting holes in turn allow the plurality of panel fasteners to attach to the protective pad. The protective panel includes a flat body and a curved body. The flat body protects the side of the dock pad, whereas the curved body protects the edge of the dock pad. As such, the flat body is connected adjacent to the curved body. Finally, each of the plurality of panel fasteners is attached to a corresponding hole from the plurality of mounting holes. Thus, the number of panel fasteners can be adjusted depending on the size and weight of the protective pad.

11 Claims, 7 Drawing Sheets

(56) References Cited

U.S. PATENT DOCUMENTS

| | | | |
|---|---|---|---|
| 2008/0256881 A1* | 10/2008 | Lowry | E06B 3/88 |
| | | | 52/212 |
| 2015/0047797 A1* | 2/2015 | Weyer | B60J 1/2094 |
| | | | 160/370.21 |
| 2015/0176326 A1* | 6/2015 | Davis | E04F 19/028 |
| | | | 52/211 |
| 2015/0322993 A1* | 11/2015 | Brewer | F16B 37/12 |
| | | | 411/82 |
| 2017/0350147 A1* | 12/2017 | Janko | A47G 1/17 |
| 2018/0073252 A1* | 3/2018 | Janko | A47G 1/17 |
| 2018/0119964 A1* | 5/2018 | Ahmadi | F24C 15/36 |

* cited by examiner

US 10,589,945 B2

PROTECTIVE PANEL FOR SHIELDING A DOCK PAD

The current application claims a priority to the U.S. Provisional Patent application Ser. No. 62/542,954 filed on Aug. 9, 2017.

FIELD OF THE INVENTION

The present invention generally relates to a protective panel for shielding a dock pad while loading and unloading cargo. More specifically, the protective panel is attached to a metallic door jamb of the loading dock and positioned to overlap the interior side of the dock pad.

BACKGROUND OF THE INVENTION

The present invention is a protective panel for shielding a dock pad while loading and unloading cargo. The present invention provides a solution to protect dock pads from tearing on the inside face from the forklift traffic moving between the warehouse and the trailer of a semitruck.

Dock pads are cushioning pads applied to the perimeter of a loading dock. The loading dock enables semitrucks to load and unload cargo directly to and from a warehouse or a storage facility. Dock pads shield the exterior surface of the warehouse or the storage facility from collisions against the truck bumper which can occur when the semitruck attempts to back into the loading bay. Generally, a forklift is used to transport the cargo from the trailer truck to the warehouse. However, the constant back and forth of the forklift through the dock pad, can cause the forklift to rub against and damage the interior face of the dock pad. As such, the purpose of the present invention is to protect the vinyl on the inside of a dock pad, from the sharp, hard, metallic surface of the forklift that enters and exits through the loading dock. By shielding the vinyl from the hard-metallic exterior of the forklift, the present invention greatly reduces costly repairs and replacements of the dock pad.

To solve this problem, the present invention utilizes a protective panel made of high-density polyethylene. Panel fasteners are used to connect the protective panel onto the metallic door jamb of the loading dock. The panel fasteners are connected with fender washers and blots to the protective panel. Real world testing conducted using the present invention, showed that the protective panel was very effective. After a two-month period of abuse, the protective panel successfully protected the dock pad.

The present invention provides an improvement from the prior arts currently available in the public domain. The prior art utilizes a thicker pad material which is still susceptible to tear from forklifts rubbing and dragging against the exterior surface. In contrast, the present invention completely isolates the forklift from the dock pad.

DETAILED DESCRIPTION OF THE INVENTION

All illustrations of the drawings are for the purpose of describing selected versions of the present invention and are not intended to limit the scope of the present invention.

Figure 1:
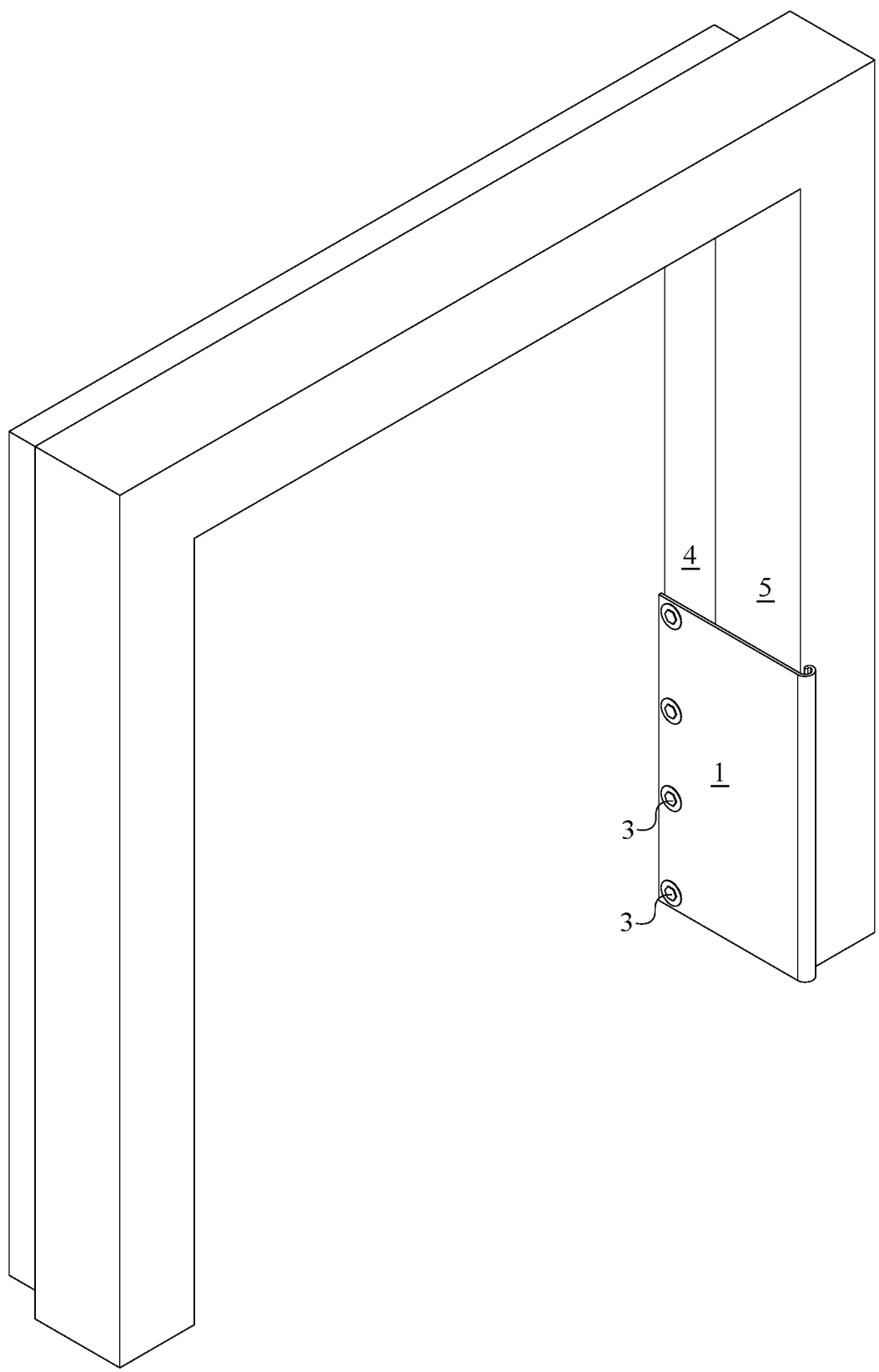
FIG. 1 is a top perspective view of the protective pad mounted onto the door jamb.

Referring to FIG. 1, the present invention is a protective panel 1 for shielding a dock pad 5 while loading and unloading cargo. Loading docks allow semitrucks to load and unload cargo directly into a warehouse or a storage facility. Loading docks are usually fitted with dock pads 5 that cushion the exterior of the warehouse from collisions against semitruck. However, these docking pads frequently get damaged by forklifts that load and unload cargo from the semitruck. Thus, the present invention is designed to shield the vinyl on the inside portion of the truck bumper and stop the costly repairs and replacement of the dock pad 5. Accordingly, the preferred embodiment of the present invention comprises a protective panel 1, a plurality of mounting holes 2, and a plurality of panel fasteners 3. The protective panel 1 is thick panel made of high-density plastics designed to shield the interior vinyl of the dock pad 5. The plurality of mounting holes 2 allows the plurality of panel fasteners 3 to attach to the protective panel 1. The plurality of panel fasteners 3 is the primary securing mechanism for connecting the protective panel 1 to the loading dock. More specifically, the plurality of panel fasteners 3 forms a magnetic bond with the metallic door jamb 4 of the loading dock.

Figure 2:
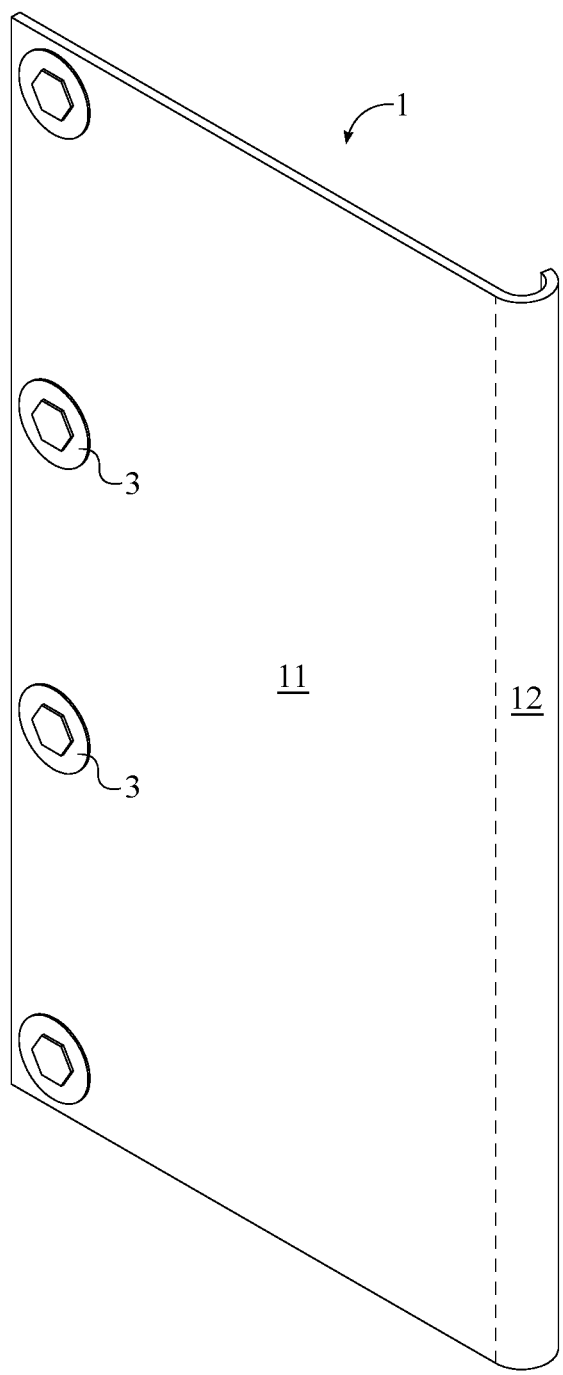
FIG. 2 is a top perspective view of the protective pad and plurality of panel fasteners.

Referring to FIG. 2, in the preferred configuration, one or more protective panels 1 line the perimeter of the loading bay. Each protective panel 1 may line one of the vertical sides of the metallic door jamb 4, thereby protecting the dock pad 5 on both sides of the forklift. The protective panel 1 may also be applied to the top of the metallic door jamb 4 for exceptionally tall forklifts. Preferably, the protective panel 1 comprises a flat body 11 and a curved body 12. The flat body 11 is a thin rectangular sheet that protects most of the dock pad 5 exposed on the sides of the loading dock. In contrast, the curved body 12 secures the distal edge of the dock pad 5. More specifically, the curved body 12 prevents sharp projections on the forklift or pallets from snagging on the dock pad 5 or the protective panel 1. This allows the forklift to travel smoothly between the truck and the protective panel 1. Preferably, the curved body 12 is connected adjacent to the flat body 11. This positions the curved body 12 adjacent to the distal edge of the dock pad 5, thereby allowing the curved body 12 to completely enclose the distal edge of the dock pad 5.

Figure 3:
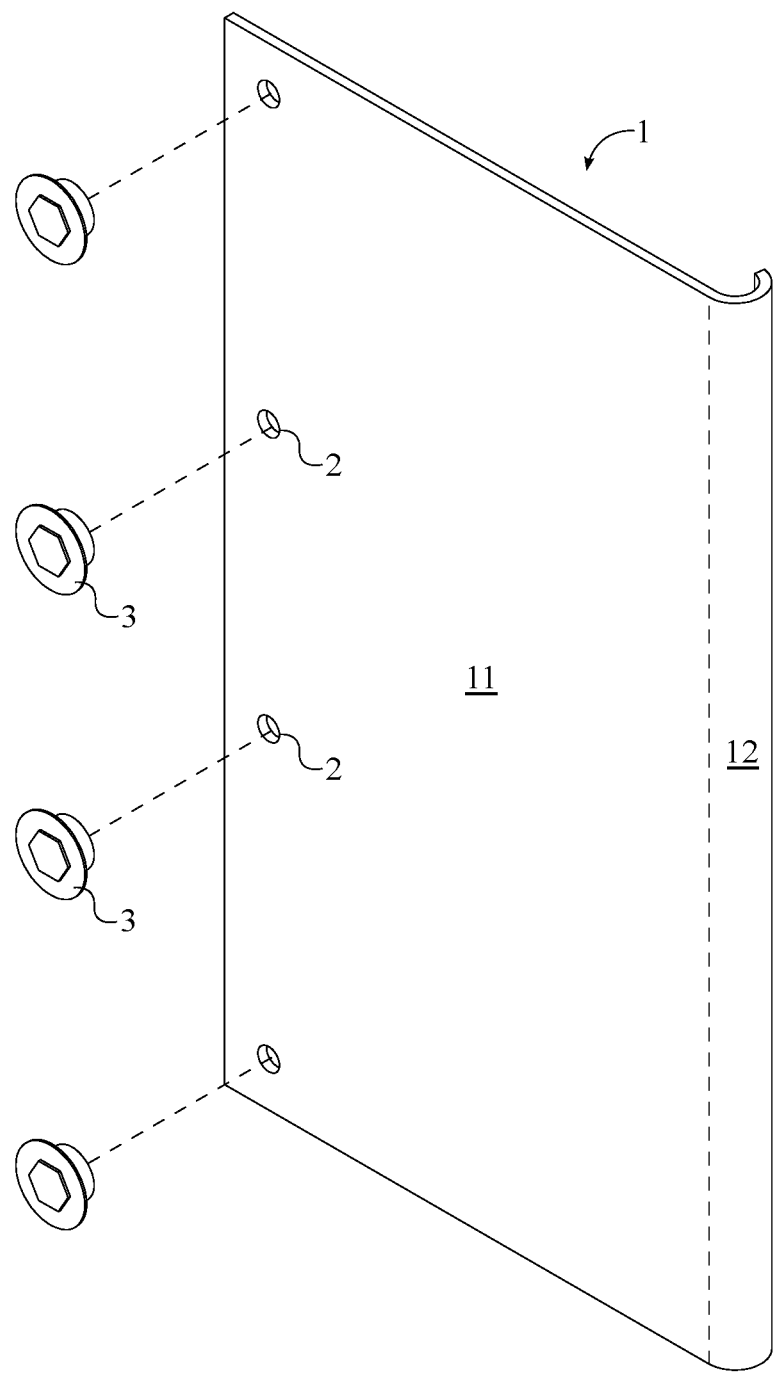
FIG. 3 is an exploded perspective view of the protective pad illustrating the plurality of mounting holes.
Figure 4:
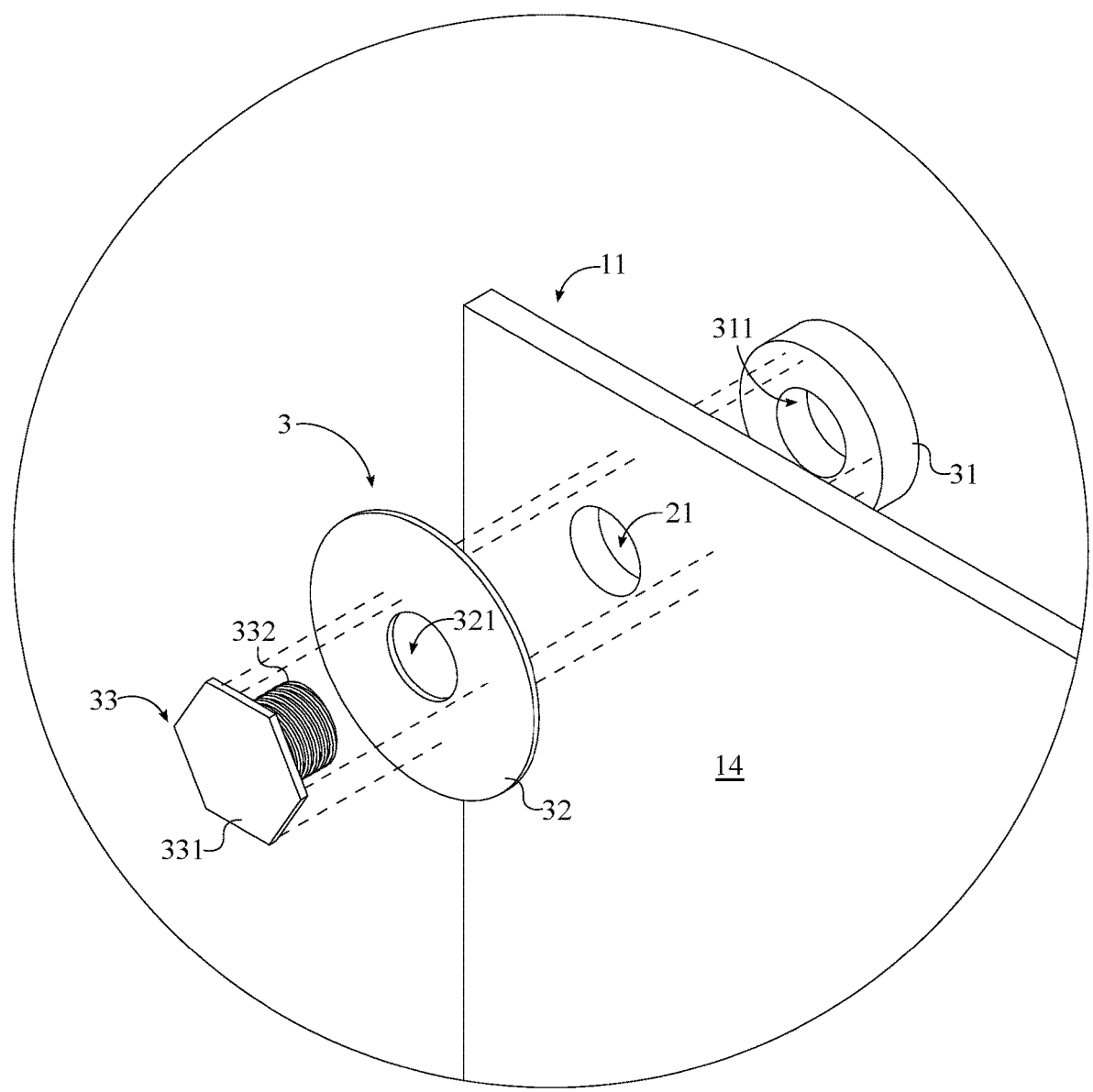
FIG. 4 is a detail view of the exterior face of the protective panel illustrating the panel fastener.

Referring to FIG. 3 and FIG. 4, in the preferred embodiment, the plurality of mounting holes 2 traverses through the flat body 11. More specifically, the plurality of mounting holes 2 may be drilled into the protective panel 1. In an alternate embodiment of the present invention, a plurality of mechanical fasteners may be used to attach the plurality of panel fasteners 3 to the flat body 11 instead of the plurality of mounting holes 2. The plurality of mechanical fasteners includes, but is not limited to, threaded slots, snaps, grooves, brackets, clamps, buckles, and/or the like. Preferably, the plurality of mounting holes 2 is positioned along the length of the flat body 11. This maximizes the space available for mounting the plurality of panel fasteners 3 onto the flat body 11. In an alternate embodiment of the present invention, the plurality of mounting holes 2 may also be positioned along the width of the flat body 11. This may be used to create an array of panel fasteners on the flat body 11. As such, each of the plurality of panel fasteners 3 is attached to a corresponding hole 21 from the plurality of mounting holes 2. Preferably, each of the plurality of panel fasteners 3 is mounted into each of the plurality of mounting holes 2. Depending on the force required to mount the protective panel 1, the number of panel fasteners utilized may change between embodiments.

Referring to FIG. 4, preferably, the plurality of panel fasteners 3 is magnetically bonded to the metallic door jamb 4 of the loading bay on one side and mechanically attached to the protective panel 1 on the opposite side. As such, the plurality of panel fasteners 3 secures the protective panel 1 against the metallic door jamb 4. In the preferred embodiment, each of the plurality of panel fasteners 3 comprises a button magnet 31, a fender washer 32, and a bolt 33. The bolt 33 interlocks the flat body 11 and the button magnet 31 together. The fender washer 32 is large circular disc with an outer diameter much larger than the diameter of the bolt 33. This gives the fender washer 32 a large surface area over which to distribute the clamping pressure of the bolt 33. As such, the fender washer 32 is used to protect the exterior of the protective panel 1 from the hard-metallic surface of the bolt 33. The bolt 33 is a conventional bolt 33 having that same diameter as the corresponding hole 21. The bolt 33 may or may not be threaded between embodiments of the present invention. Finally, the button magnet 31 is a cylindrical magnet that may either be mechanically fastened or magnetically bonded to the bolt 33. The button magnet 31 and the fender washer 32 are attached at opposite ends of the bolt 33, which positions the button magnet 31 and the fender washer 32 on opposite sides of the flat body 11.

In yet another embodiment, a plurality of panel fasteners 3 is a plurality of bolts instead. Further, a mounting bracket is used to attach the protective panel to the metallic door jamb 4. The preferred mounting bracket is a flat bar of steel that can be either welded or bolted to the metallic door jamb 4. Each of the plurality of bolts is connected onto the mounting bracket. To mount the protective panel 1 onto the mounting bracket, each of the plurality of mounting holes 2 is attached to a corresponding bolt from the plurality of bolts. Further, a fender washer and a nut are then attached to the corresponding bolt. This affixes the each of the plurality of mounting holes 2 to the corresponding bolt.

Figure 5:
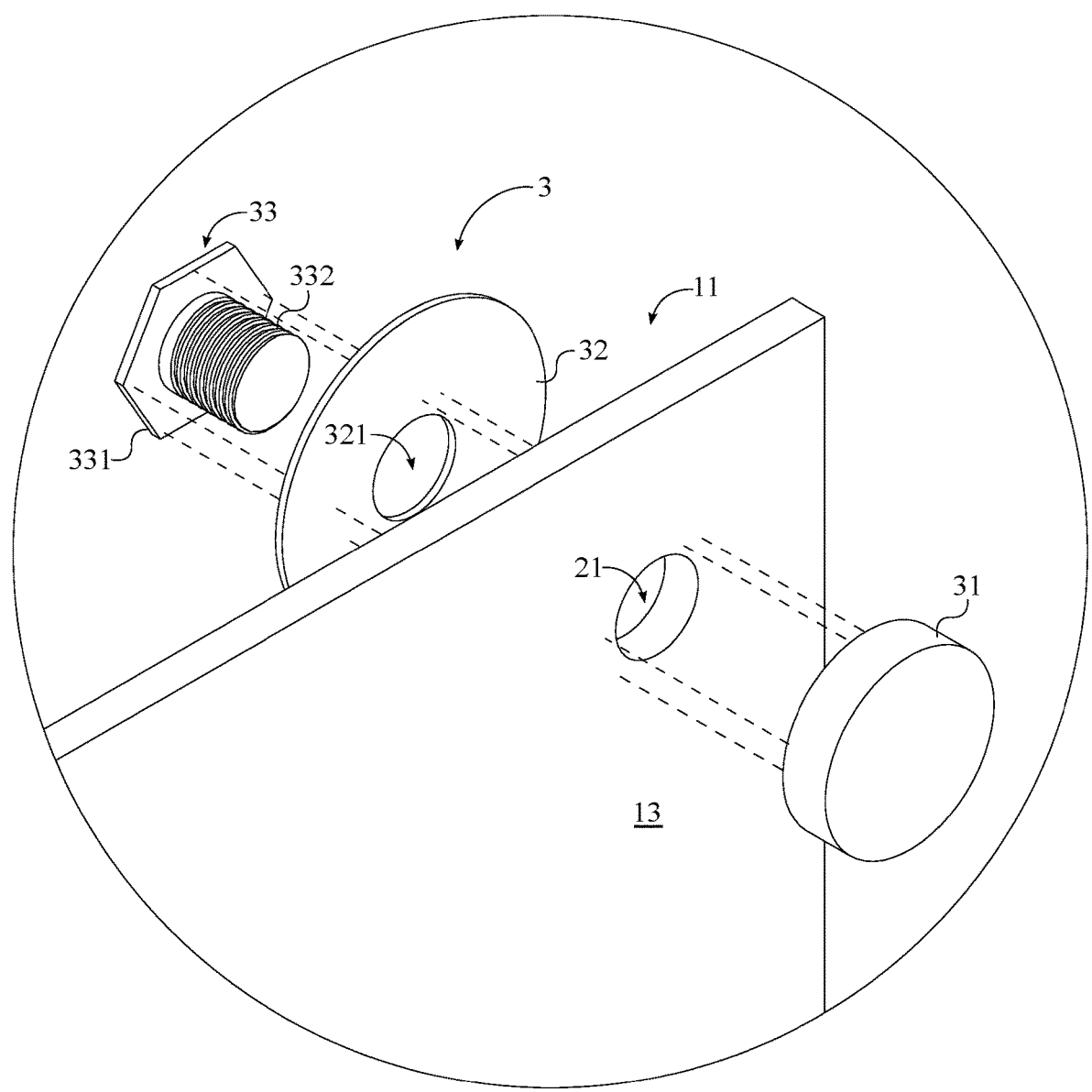
FIG. 5 is a detail view of the interior face of the protective panel illustrating the panel fastener.

Referring to FIG. 4 and FIG. 5, accordingly, the protective panel 1 comprises an interior face 13 and an exterior face 14. The interior face 13 is defined as the side of the protective panel 1 facing the metallic door jamb 4. The exterior face 14 is defined as the side of the protective panel 1 facing the passageway through the loading dock. In the preferred configuration, the bolt 33 presses against the exterior face 14. Given that hard-metallic composition of the bolt 33, the fender washer 32 is used to protect the exterior face 14. Accordingly, the fender washer 32 is positioned adjacent to the exterior face 14.

This positions the fender washer 32 between the bolt 33 and the exterior face 14. In contrast, the button magnet 31 is preferably made of a softer material than the bolt 33, therefore obviating the need for a washer to protect the interior face 13. As such, the button magnet 31 is positioned adjacent to the interior face 13, opposite the fender washer 32. However, in alternate embodiments, a washer may be positioned between the button magnet 31 and the exterior face 13. In the preferred embodiment, the bolt 33 traverses into the button magnet 31 through the fender washer 32 and the corresponding hole 21. More specifically, a terminal portion of the bolt 33 is embedded partially into the button magnet 31. This connects the button magnet 31 to the bolt 33 and the protective panel 1. In one possible embodiment, the connection may be created by magnetically bonding the button magnet 31, the fender washer 32, and the bolt 33 together. In another possible embodiment of the present invention, the button magnet 31 may be mechanically connected to the bolt 33. In both embodiments, the bolt 33 provides a means to connect the button magnet 31 to the protective panel 1.

Referring more specifically to FIG. 4, in the preferred embodiment of the present invention, the fender washer 32 comprises a thru-hole 32. The thru-hole 32 allows the bolt 33 to traverse through the fender washer 32. Similarly, the button magnet 31 comprises an insertion hole 311. The insertion hole 311 is circular hole that traverses partially through the width of the button magnet 31. Finally, the bolt 33 comprises a bolt head 331 and a threaded member 332. The bolt head 331 allows the bolt 33 to interlock onto the corresponding hole 21, whereas the threaded member 332 connects onto the button magnet 31.

Preferably, the bolt head 331 is terminally connected to the threaded member 332. Further, the thru-hole 32 and the insertion hole 311 are positioned concentric to the corresponding hole 21. This allows the threaded member 332 to travel in a generally horizontal direction through the corresponding hole 21, thereby reducing wear and friction between the bolt 33 and the corresponding hole 21. The bolt head 331 prevents the separation of the protective panel 1 from the metallic door jamb 4. As such, the bolt head 331 is positioned adjacent to the fender washer 32, opposite the exterior face 14. Preferably, the width of the bolt head 331 is sized to be large enough to secure the fender washer 32 but small enough to fit within the diameter of the fender washer 32. On the interior face 13, the insertion hole 311 is terminally attached to the threaded member 332, opposite the bolt head 331. As such, the connection between the insertion hole 311 and the button magnet 31 prevents the button magnet 31 from separating from the protective panel 1.

In one possible embodiment, the magnetic bond between the button magnet 31 and the threaded member 332 prevents the threaded member 332 from ejecting out of the insertion hole 311. In another possible embodiment, the button magnet 31 may also magnetically bond with the fender washer 32 and the bolt head 331 on the exterior face 14 of the protective panel 1. In both cases, the magnetic bond prevents the ejection of the threaded member 332 from the insertion hole 311.

In another possible embodiment, the insertion hole 311 is threaded. More specifically, the lateral face of the insertion hole 311 is fashioned with female threads. Accordingly, the threaded member 332 is fashioned with matching male threads. To connect the threaded member 332 into the insertion hole 311, the button magnet 31 may be screwed on to the threaded member 332 exposed out of the corresponding hole 21. This prevents the button magnet 31 from separating from the protective panel 1.

In the preferred embodiment, the protective panel 1 is made of high-density polyethylene. Polyethylene has high ductility, impact strength, and a low friction. This allows the forklift to easily glide past the protective panel 1. Alternately, the protective panel 1 may be made of similar high-density polymeric materials known in the relevant arts.

Figure 6:
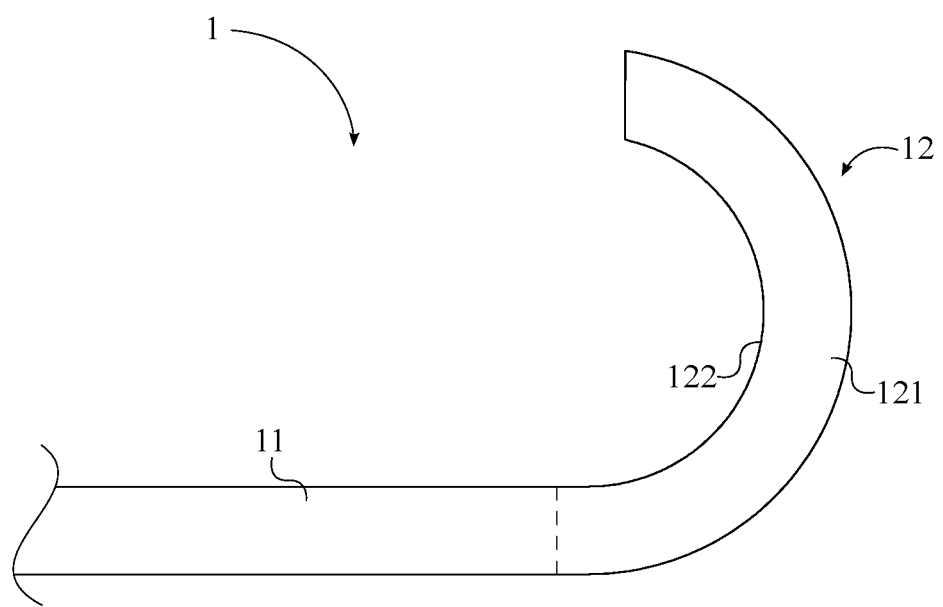
FIG. 6 is a top detail view of the curved body illustrating the first arcuate portion.

Referring to FIG. 6, the preferred embodiment of the curved body 12 comprises a first arcuate portion 121. The first arcuate portion 121 deflects the projections or protrusions of the forklift away from the distal edge of the dock pad 5. Accordingly, the first arcuate portion 121 is terminally connected to the flat body 11.

Figure 7:
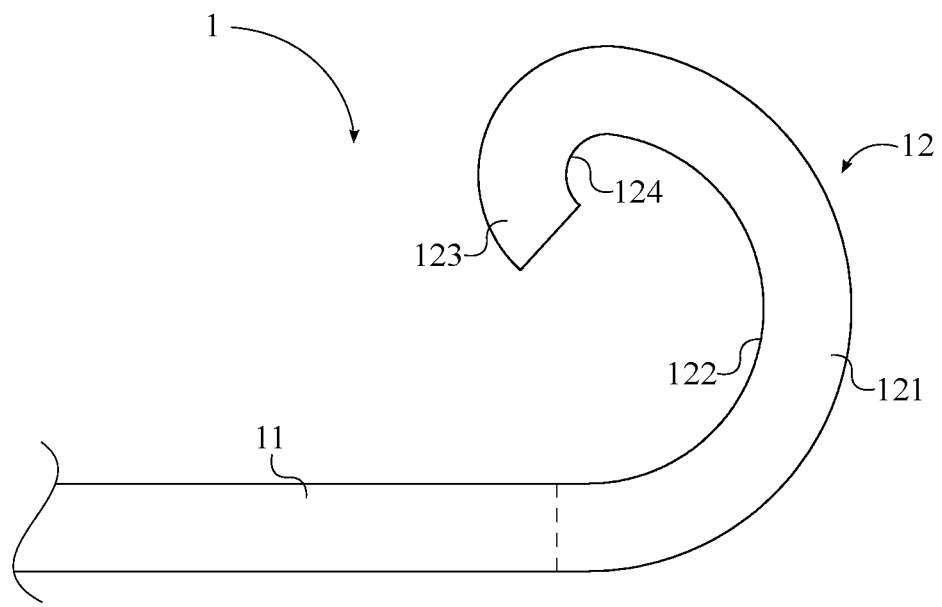
FIG. 7 is a top detail view of the curved body illustrating the first arcuate portion and the second arcuate portion.

Referring to FIG. 7, in an alternate embodiment, the curved body 12 comprises a first arcuate portion 121 and a second arcuate portion 123. The first arcuate portion 121 deflects the projections or protrusions of the forklift away from the distal edge of the dock pad 5. Accordingly, the first arcuate portion 121 is terminally connected to the flat body 11. The second arcuate portion 123 rounds the edge of the first arcuate portion 121. This allows the distal edge of the dock pad 5 to easily fit into the first arcuate portion 121.

Further, the first arcuate portion 121 comprises a first concave side 122. Similarly, the second arcuate portion 123 comprises a second concave side 124. The first concave side 122 is preferably hemispherical in shape and gives the curved body 12 the optimal shape to deflect angular objects such as the wheels or bumpers of the forklift. Once mounted onto the dock pad 5, the first concave side 122 partially circumscribes the distal edge of the dock pad 5. Similarly, the second concave side 124 is also hemispherical in shape and provides the distal edge a smooth transition into the first concave side 122. In the preferred embodiment, the first concave side 122 is oriented towards the second concave side 124. As such, in the attached position, the dock pad 5 rests against the concave side of the second arcuate portion 123, thereby preventing damage to the dock pad 5. Moreover, a diameter of the first concave side 122 is greater than a diameter of the second concave side 123. This creates amble room within the first arcuate portion 121 for the distal edge.

Although the invention has been explained in relation to its preferred embodiment, it is to be understood that many other possible modifications and variations can be made without departing from the spirit and scope of the invention as hereinafter claimed.

What is claimed is:

1. A protective panel device for shielding a dock pad while loading and unloading cargo comprises:
   a protective panel;
   a plurality of mounting holes;
   a plurality of panel fasteners;
   the protective panel comprises a flat body and a curved body;
   the curved body being connected adjacent to the flat body;
   the plurality of mounting holes traversing through the flat body;
   the plurality of mounting holes being positioned along the length of the flat body;
   each of the plurality of panel fasteners being attached to a corresponding hole from the plurality of mounting holes;
   each of the plurality of panel fasteners comprises a button magnet, a fender washer, and a bolt;
   the protective panel comprises an interior face and an exterior face;
   the interior face being positioned opposite the exterior face about the flat body;
   the fender washer being positioned adjacent to the exterior face;
   the button magnet being positioned adjacent to the interior face, opposite the fender washer; and
   the bolt traversing into the button magnet through the fender washer and the corresponding hole.

2. The protective panel device as claimed in claim 1 comprises:
   the fender washer comprises a thru-hole;
   the button magnet comprises an insertion hole;
   the bolt comprises a bolt head and a threaded member;
   the bolt head being terminally connected to the threaded member;
   the thru-hole and the insertion hole being positioned concentric to the corresponding hole;
   the threaded member traversing through the thru-hole and the corresponding hole;
   the bolt head being positioned adjacent to the fender washer, opposite the exterior face; and
   the insertion hole being terminally attached to the threaded member, opposite the bolt head.

3. The protective panel device as claimed in claim 2, wherein the insertion hole is threaded.

4. The protective panel device as claimed in claim 1, wherein the protective panel is made of high-density polyethylene.

5. The protective panel device as claimed in claim 1 comprises:
   the curved body comprises a first arcuate portion and a second arcuate portion;
   the first arcuate portion being terminally connected to the flat body; and
   the second arcuate portion being terminally connected to the first arcuate portion.

6. The protective panel device as claimed in claim 1 comprises:
   the first arcuate portion comprises a first concave side;
   the second arcuate portion comprises a second concave side; and
   the first concave side being oriented towards the second concave side.

7. A protective panel device for shielding a dock pad while loading and unloading cargo comprises:
   a protective panel;
   a plurality of mounting holes;
   a plurality of panel fasteners;
   the protective panel comprises a flat body and a curved body;
   the curved body comprises a first arcuate portion and a second arcuate portion;
   the curved body being connected adjacent to the flat body;
   the plurality of mounting holes traversing through the flat body;
   the plurality of mounting holes being positioned along the length of the flat body;
   each of the plurality of panel fasteners being attached to a corresponding hole from the plurality of mounting holes;
   the first arcuate portion being terminally connected to the flat body;
   the second arcuate portion being terminally connected to the first arcuate portion;
   each of the plurality of panel fasteners comprises a button magnet, a fender washer, and a bolt;
   the protective panel comprises an interior face and an exterior face;
   the interior face being positioned opposite the exterior face about the flat body;
   the fender washer being positioned adjacent to the exterior face;
   the button magnet being positioned adjacent to the interior face, opposite the fender washer; and
   the bolt traversing into the button magnet through the fender washer and the corresponding hole.

8. The protective panel device as claimed in claim 7 comprises:
  the fender washer comprises a thru-hole;
  the button magnet comprises an insertion hole;
  the bolt comprises a bolt head and a threaded member;
  the bolt head being terminally connected to the threaded member;
  the thru-hole and the insertion hole being positioned concentric to the corresponding hole;
  the threaded member traversing through the thru-hole and the corresponding hole;
  the bolt head being positioned adjacent to the fender washer, opposite the exterior face; and
  the insertion hole being terminally attached to the threaded member, opposite the bolt head.

9. The protective panel device as claimed in claim 8, wherein the insertion hole is threaded.

10. The protective panel device as claimed in claim 7, wherein the protective panel is made of high-density polyethylene.

11. The protective panel device as claimed in claim 7 comprises:
  the first arcuate portion comprises a first concave side;
  the second arcuate portion comprises a second concave side; and
  the first concave side being oriented towards the second concave side.

* * * * *